(12) United States Patent
Cheng

(10) Patent No.: US 6,523,853 B1
(45) Date of Patent: Feb. 25, 2003

(54) SAFE FOLDING DEVICE FOR A FOLDABLE STROLLER

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/992,010

(22) Filed: Nov. 5, 2001

(51) Int. Cl.[7] .............................. B62B 7/06; B62B 9/24
(52) U.S. Cl. ...................................... 280/642; 280/650
(58) Field of Search .................................. 280/642, 647, 280/648, 650, 655, 655.1, 657, 658, 47.38, 79.2; 297/313, 337

(56) References Cited

U.S. PATENT DOCUMENTS

| | | | | |
|---|---|---|---|---|
| 4,639,012 A | * | 1/1987 | Jensen ......................... | 280/642 |
| 4,768,795 A | * | 9/1988 | Mar ............................. | 280/648 |
| 4,805,928 A | * | 2/1989 | Nakao et al. ................ | 280/650 |
| 5,393,122 A | * | 2/1995 | Andrisin, III ............... | 280/47.38 |
| 5,921,574 A | * | 7/1999 | Driessen et al. ........... | 280/655.1 |

FOREIGN PATENT DOCUMENTS

| | | | | |
|---|---|---|---|---|
| EP | 114532 | * | 8/1984 | ................ 280/650 |
| GB | 639439 | * | 6/1950 | ................ 280/642 |
| GB | 2106048 | * | 4/1983 | ................ 280/650 |
| GB | 2196908 | * | 5/1988 | ................ 280/642 |

* cited by examiner

Primary Examiner—Frank Vanaman
(74) Attorney, Agent, or Firm—Dorsey & Whitney LLP

(57) ABSTRACT

A safe folding device, useable with a foldable stroller, includes left and right side folding mechanisms that can fold when as associated left or right side button is pressed. The safe folding device further includes a base plate disposed beneath a seat portion of the foldable stroller, which member has left and right side protuberances. A rope or web member is affixed to the base plate such that a user can exert tension on the member with a single hand and cause both folding mechanism buttons to be pressed, thereby allowing the stroller to be folded.

15 Claims, 4 Drawing Sheets

SAFE FOLDING DEVICE FOR A FOLDABLE STROLLER

BACKGROUND OF THE INVENTION

1. Field of the Invention

The present invention relates to a safe folding device for a foldable stroller, more particularly to an improved safe folding device for a foldable stroller, wherein the foldable stroller can be collapsed in a very convenient, safe and easy manner.

2. Description of the Related Art

In recent years, there is provided a safe folding device for various foldable strollers. In a conventional foldable stroller, there are various kinds of folding devices for a foldable stroller. For example, typically there is a folding mechanism at both sides of a foldable stroller respectively, whereby a control switch is actuated by hands to collapse a foldable stroller. However, there is a major problem in this design that there is danger hands of a user could be clamped when the joint of the folding mechanism is closed. Therefore, there is designed a folding device for foldable stroller to solve the above problem. As shown in FIG. 1, there is disclosed a foldable stroller (100) having a safe folding device (110) provided at both sides of the foldable stroller respectively. When a user intends to collapse the foldable stroller, all he or she has to do is to press the button (112) on the safe folding device (110) to release the engaged status (unshown in the figures) of the foldable stroller to collapse the foldable stroller for storage or carriage. Though the stroller shown in FIG. 1 overcomes the fault of clamping hands of a user, the user still needs to use both hands for simultaneously pressing down buttons (112) to release the engaged status of a foldable stroller so that it is not convenient in use.

SUMMARY OF THE INVENTION

In view of the above shortcomings, the present invention improves the convenience of a foldable stroller in use so that a user can collapse the foldable stroller in an easy and convenient manner.

According to one aspect of the present invention, there is provided a safe folding device for a foldable stroller, comprising a pair of folding mechanisms each having a button, the folding mechanism being provided at left and right side of a foldable stroller; a base plate of a foldable stroller, provided below a baby seat and having a protuberance at both sides respectively; and an operation rope, fixed on one surface of the base plate, wherein a user may simply pull the operation rope upward by one single hand so that the protuberances of the base plate of the baby seat are brought to press the buttons of the folding mechanism to release the engaged status to collapse the foldable stroller when a user intends to collapse the foldable stroller for storage or carriage.

According to another aspect of the present invention, there is provided a limiting groove provided on the protuberance and a limiting pin on the folding mechanism so that the limiting pin can move in the limiting groove to guide the moving direction of the protuberance and limit the moving distance thereof.

According to another aspect of the present invention, the button of the folding mechanism is provided on lower side or inner side.

The merit of the present invention resides in that only one single hand is needed when a user intends to collapse a foldable stroller, and the operating manner thereof is very convenient and easy.

The other objects, merits and novel features of the present invention are obvious by the following detailed description together with accompany drawings.

DESCRIPTION OF THE PREFERRED EMBODIMENT

Now referring to FIG. 2, the safe folding device according to one embodiment of the present invention will be described in detail.

Figure 1:
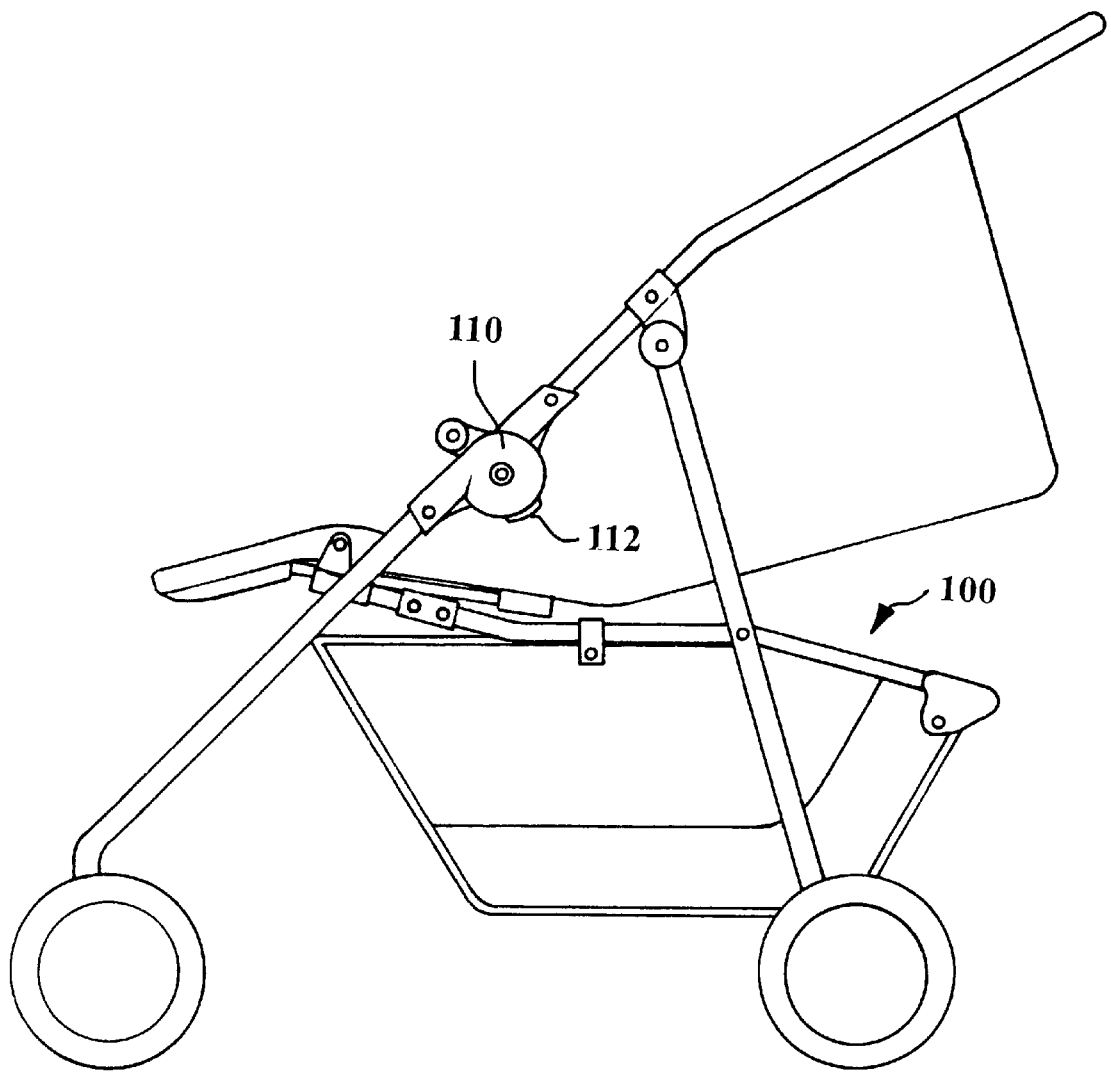
FIG. 1 is a side view, showing the structure of a conventional foldable stroller having a safe folding device.
Figure 2:
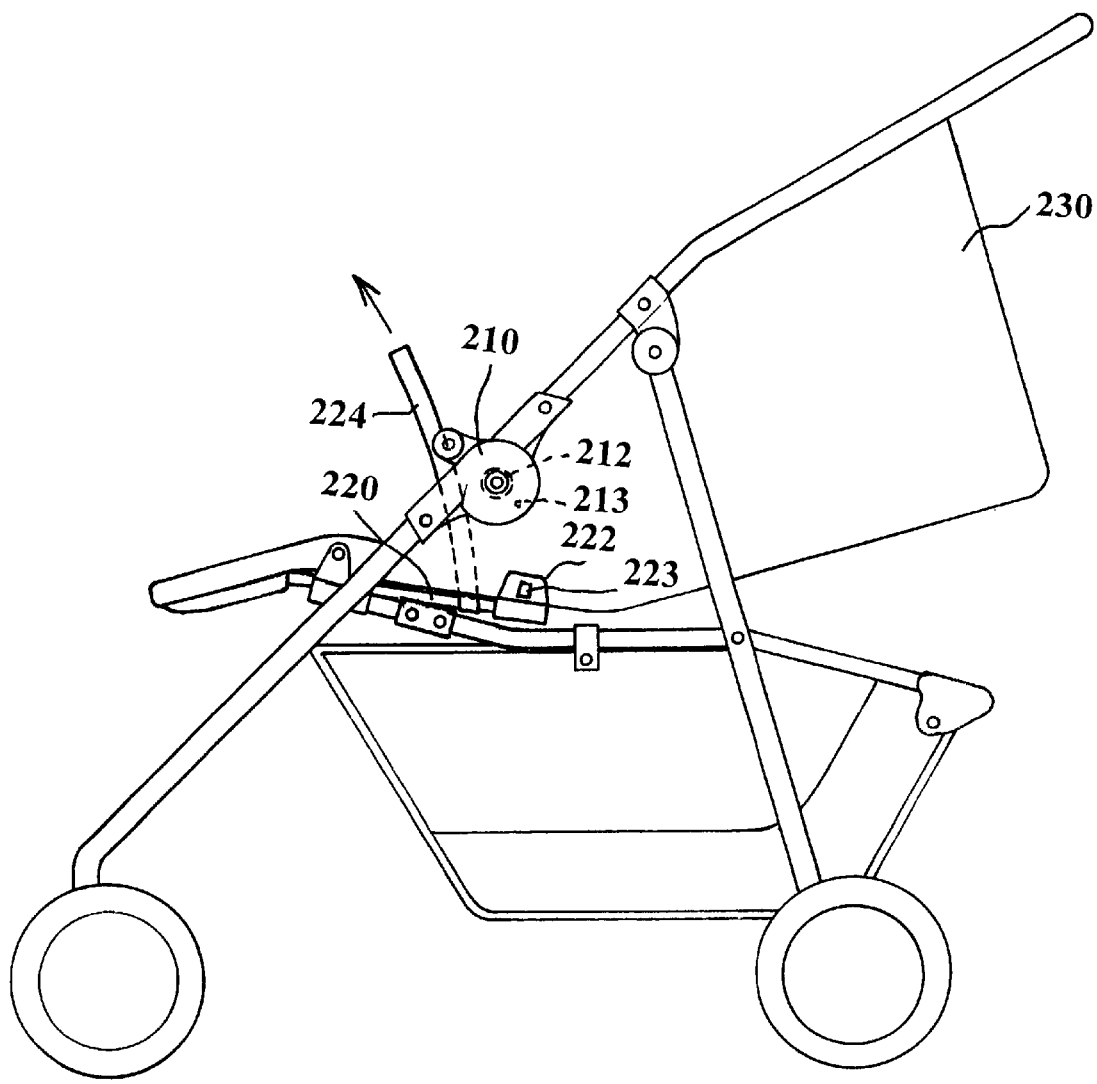
FIG. 2 is a side view, showing the structure of a foldable stroller according to the present invention.

As shown in FIG. 2, the safe folding device according to the present invention comprises: a pair of folding mechanisms (210) having a button (212), which are provided at right and left sides of a foldable stroller respectively; a base plate (220) for a baby seat (230), provided below a baby seat (230) and having a protuberance (222) at both sides respectively; and an operation rope (224), fixed on one surface of the base plate (220).

The folding mechanism (210) is a general folding mechanism which is popularly used in an ordinary foldable stroller, wherein the foldable stroller is fully stretched in the first engaged status (unshown in the figures) and the foldable stroller is collapsed for storage or carriage in the second engaged status (unshown in the figures). Of course, the folding mechanism (210) could be designed to have more than two engaged statuses if necessary. Since the design of the folding mechanism (210) is not major feature of the present invention, the detailed description of the folding mechanism (210) is omitted. The button (212) is a switch button of the folding mechanism (210) for switching the first engaged status and the second engaged status of the folding mechanism (210), which is used to release the engaged status of the folding mechanism (210). When the button (212) is pressed downward, the foldable stroller can be collapsed for storage. Usually, the button (212) cooperates with a spring or the like (unshown in the figures). When an external force is applied, the button (212) would be pressed downward. Once the external force disappears, the button (212) would be returned to its normal (original) position due to the recovery force produced by the spring. Similarly, the design of the button (212) is not major feature of the present invention, the detailed description of the button (212) is omitted.

The baby seat (230) is used for receiving or accommodating a baby. Below the baby seat (230), there is provided a base plate (220) for supporting the baby seat (230). According to the safe folding device of one embodiment of the present invention, two corresponding protuberances (222) are provided at both sides of the base plate (220) respectively, as shown in FIG. 2. The function of the protuberances (222) is to contact and press down the button (212) to release the engaged status of the folding mechanism (210) (described later). According to the safe folding device of one embodiment of the present invention, an operation rope (224) is provided on one surface of the base plate (220), wherein two ends of the operation rope (224) are fixed on the base plate (220), as shown in FIG. 2. When a user intends to collapse the foldable stroller, all he or she has to do is to pull the operation rope (224) upward by one single hand to bring the base plate (220) upward so that the protuberances (222) contact and then press downward the button (212) of the folding mechanism (210) to release the engaged status of the folding mechanism (210) to collapse the foldable stroller. As shown in FIG. 2, button 212 may be disposed at a lower side of folding mechanism 210.

Figure 6:
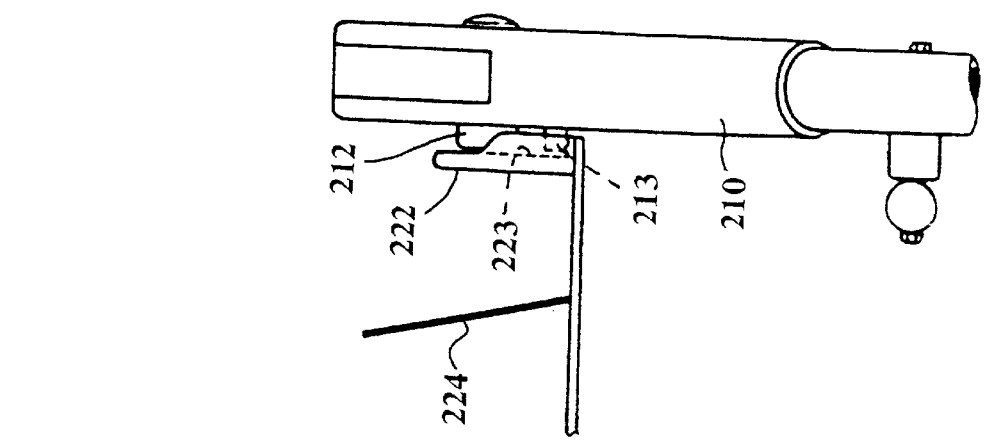
FIG. 6 is a view, showing the status of the safe folding device shown in FIG. 3 when a user pulls the operation rope upward completely so that the protuberance of the base plate presses down the button of the folding mechanism to release the engaged status of the folding mechanism to collapse the foldable stroller.
Figure 5:
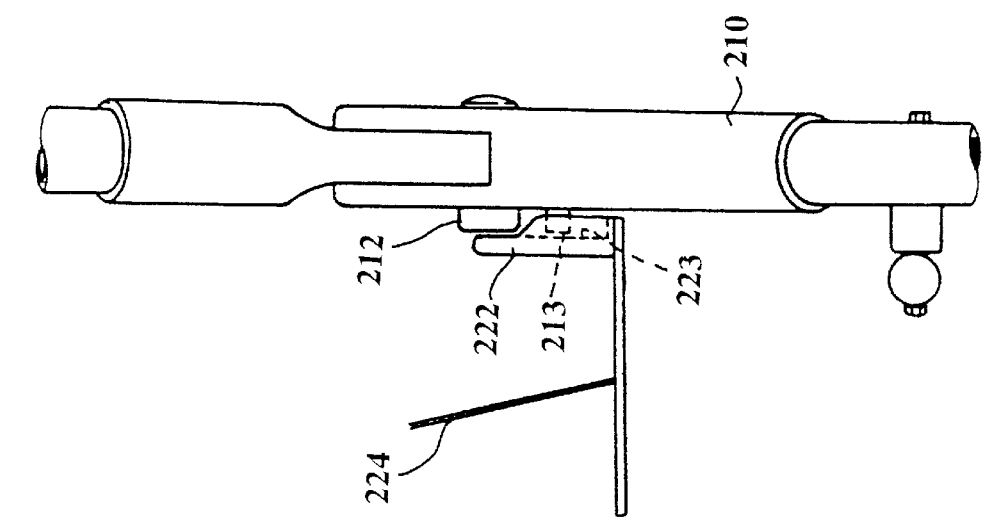
FIG. 5 is a view, showing the status of the safe folding device shown in FIG. 3 when a user pulls the operation rope upward to the extent that the protuberance of the base plate just contacts the button of the folding mechanism.
Figure 4:
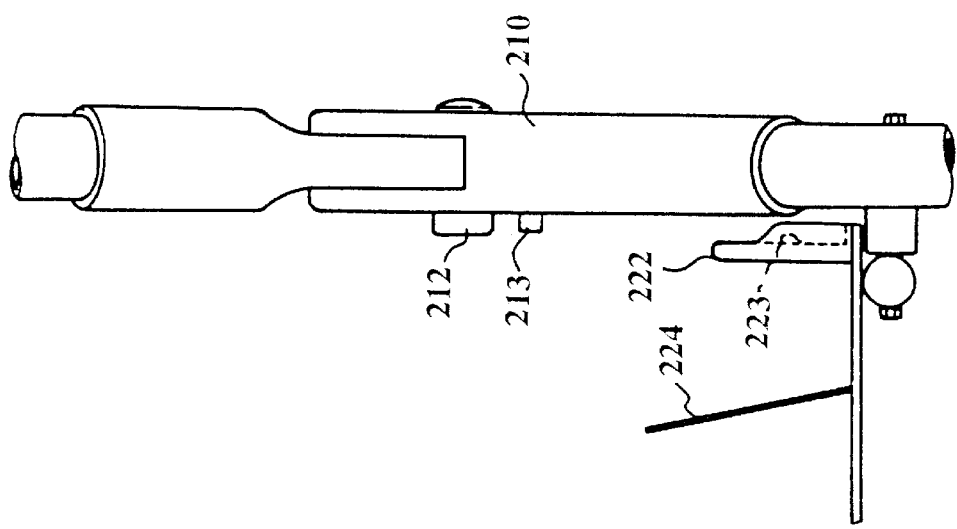
FIG. 4 is a view, showing the status of the safe folding device shown in FIG. 3 when the foldable stroller is not collapsed.

Referring to FIGS. 4–6, the operation status of the safe folding device according to one embodiment of the present invention is explained as follows.

Figure 3:
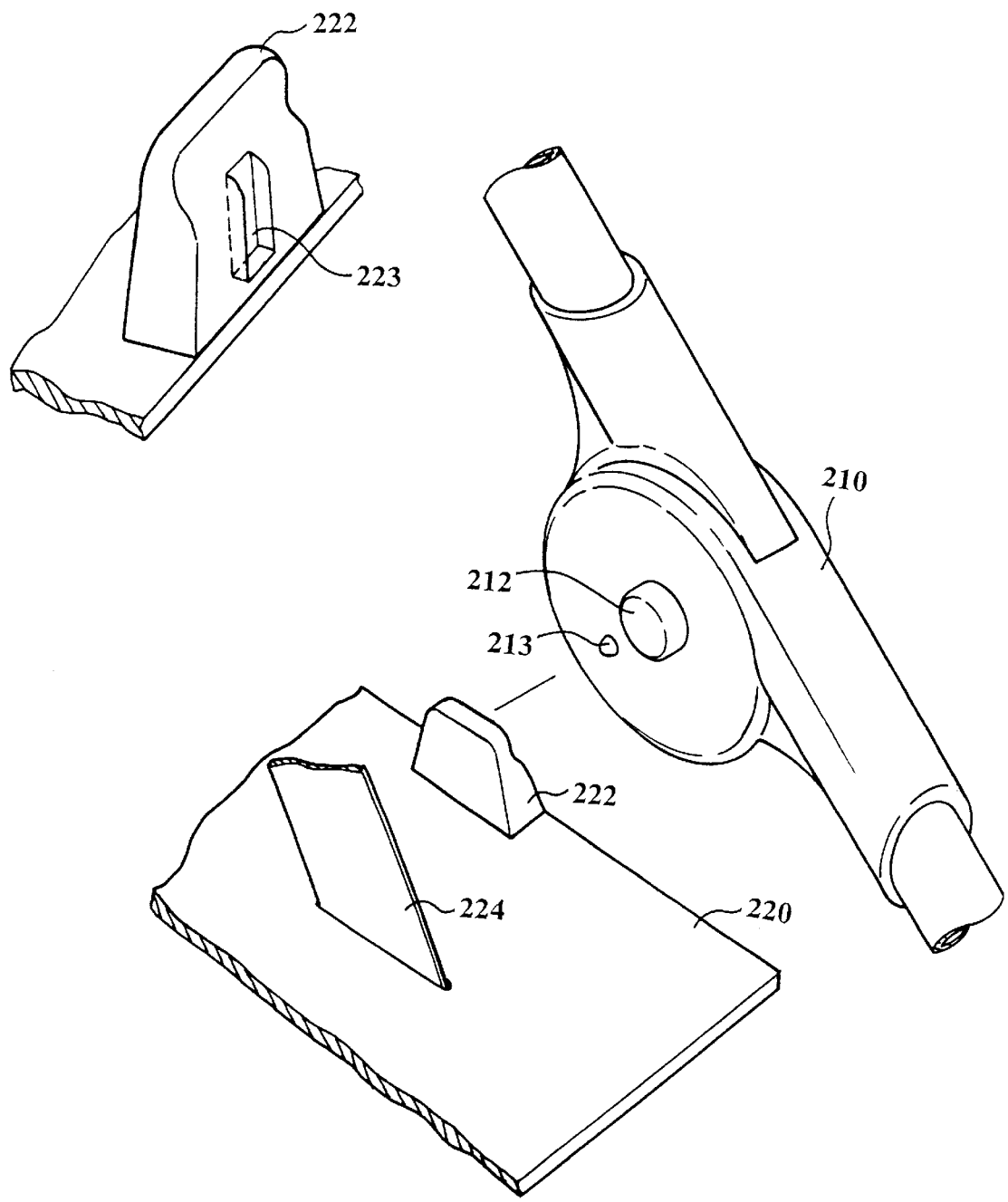
FIG. 3 is a partial perspective view, showing the safe folding device according to one embodiment of the present invention.

FIG. 4 is a view, showing the status of the safe folding device shown in FIG. 3 when the foldable stroller is not collapsed, i.e. the situation where the foldable stroller is in normal use (not collapsed). FIG. 5 is a view, showing the status of the safe folding device shown in FIG. 3 when a user pulls the operation rope (224) upward to the extent that the protuberances (222) of the base plate (220) just contact the button (212) of the folding mechanism (210). FIG. 6 is a view, showing the status of the safe folding device shown in FIG. 3 when a user pulls the operation rope (224) upward completely so that the protuberances (222) of the base plate (220) press down the button (212) of the folding mechanism (210) to release the engaged status of the folding mechanism (210) to collapse the foldable stroller.

As shown in FIGS. 4–6, when a user intends to collapse the foldable stroller, all he or she has to do is to pull the operation rope (224) upward by one single hand to bring the base plate (220) upward so that the protuberances (222) contact and then press downward the button (212) of the folding mechanism (210) to release the engaged status of the folding mechanism (210) to collapse the foldable stroller.

According to another aspect of the present invention, there is provided a limiting groove (223) on the protuberance (222), as shown in FIG. 3. The limiting groove (223) cooperates with a limiting pin (213) for directing the moving direction of the protuberances (222) and limiting the moving distance thereof so as to make sure the protuberances (222) can precisely and correctly contact and press down the button (212) of the folding mechanism (210) to avoid the improper operation due to a user over draws the operation rope (224).

Though the button (212) is provided at the inner side of the folding mechanism (210) in FIG. 3, the button (212) may be provided at the lower side of the folding mechanism (210) if necessary in a special design as long as the button (212) can cooperate with the design of protuberance (222) to achieve the effect of collapsing a foldable stroller by the operation rope (224). Similarly, the button (212) can be designed in various manners once if the action of pressing down the button (212) can release the engaged status of the folding mechanism (210).

The safe folding device for a foldable stroller according to the present invention has many merits, for example, a use can release the engaged status of a folding mechanism with only one single hand by means of using an operation rope so that a foldable stroller can be collapsed in a simple and convenient way. Besides, since the operation rope is mounted on the base plate below the baby seat, a user can not collapse the foldable stroller when a baby is in the foldable stroller. Therefore, danger incidentally caused by improper operation of a foldable stroller can be effectively avoided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by appended claims and their equivalents.

NUMERAL REFERENCE 100 foldable stroller
110 safe folding device
112 button
210 folding mechanism
212 button
213 limiting pin
220 base plate
222 protuberance
223 limiting groove
224 operation rope
230 baby seat

What is claimed is:

1. A safe folding device for use with a foldable stroller, the safe folding device comprising:
a first folding mechanism, disposed on a first side of said foldable stroller, having a first push-button that when pressed enables said first folding mechanism to fold;
a second folding mechanism, disposed on a second side of said foldable stroller, having a second push-button that when pressed enables said second folding mechanism to fold;
a base plate member, disposed beneath a seat portion of said foldable stroller, having a first protuberance disposed on a first side of said base member, and having a second protuberance disposed on a second side of said base member; and
a rope member having at least one end affixed to a portion of said base plate member;
wherein tension on said rope member causes said first protuberance to push against said first push-button and causes said second protuberance to push against said second push-button such that said first folding mechanism and said second folding mechanism can be folded.

2. The safe folding device of claim 1, wherein at least said first protuberance defines a groove sized to accept at least a portion of said first push-button.

3. The safe folding device of claim 1, wherein said first protuberance defines a first groove sized to accept at least a portion of said first push-button, and said second protuberance defines a second groove sized to accept at least a portion of said second push-button.

4. The safe folding device of claim 1, further including means for limiting range of movement of at least said first protuberance relative to said first push-button.

5. The safe folding device of claim 1, further including means for limiting range of movement of said first protuberance relative to said first push-button, and for limiting range of movement of said second protuberance relative to said second push-button.

6. The safe folding device of claim 1, wherein said first push-button is located on said first folding mechanism at a location selected from a group consisting of (a) a lower side region of said first folding mechanism, and (b) an inner side region of said first folding mechanism.

7. The safe folding device of claim 1, wherein said first folding mechanism, said second folding mechanism, and said base plate member are disposed such that said tension on said rope member is exertable from one hand of a user of said safe folding device.

8. The safe folding device of claim 1, wherein said rope member is rectangular in cross-section.

9. The safe folding device of claim 1, wherein said rope member has two ends, each of said ends being affixed to a portion of said base plate member.

10. A safe folding device for use with a foldable stroller, the safe folding device comprising:
   a first folding mechanism, disposed on a first side of said foldable stroller, having a first push-button that when pressed enables said first folding mechanism to fold;
   a second folding mechanism, disposed on a second side of said foldable stroller, having a second push-button that when pressed enables said second folding mechanism to fold;
   a seat member having a first protuberance disposed on a first side of said seat member, and having a second protuberance disposed on a second side of said seat member; and
   means for conveying user-applied tension, coupled to a portion of said base plate member;
   wherein user-applied tension to said means for conveying causes said first protuberance to push against said first push-button and causes said second protuberance to push against said second push-button such that said first folding mechanism and said second folding mechanism can be folded.

11. The safe folding device of claim 10, wherein said first protuberance defines a first groove sized to accept at least a portion of said first push-button, and said second protuberance defines a second groove sized to accept at least a portion of said second push-button.

12. The safe folding device of claim 10, further including means for limiting range of movement of said first protuberance relative to said first push-button, and for limiting range of movement of said second protuberance relative to said second push-button.

13. The safe folding device of claim 10, wherein said means for conveying includes a rope member.

14. The safe folding device of claim 10, wherein said means for conveying includes a web member.

15. The safe folding device of claim 10, wherein said first folding mechanism, said second folding mechanism, and said seat member are disposed such that said user-applied tension on said means for conveying is exertable from one hand of a user of said safe folding device.

* * * * *